United States Patent [19]

Koga

[11] Patent Number: 5,109,945
[45] Date of Patent: May 5, 1992

[54] SAFETY DEVICE FOR USE WHEN DRIVER LEAVES A SEAT OF AN INDUSTRIAL VEHICLE

[75] Inventor: Toshiharu Koga, Aichi, Japan

[73] Assignee: Sumitomo Yale Co., Ltd., Japan

[21] Appl. No.: 649,199

[22] Filed: Feb. 4, 1991

Related U.S. Application Data

[63] Continuation of Ser. No. 417,153, Oct. 4, 1989, abandoned.

[30] Foreign Application Priority Data

Oct. 7, 1988 [JP] Japan .................. 63-130948[U]

[51] Int. Cl.$^5$ .............................................. B60K 28/04
[52] U.S. Cl. ........................................ 180/273; 180/272
[58] Field of Search ............... 180/272, 273; 414/674

[56] References Cited

U.S. PATENT DOCUMENTS

| 3,500,946 | 3/1970 | Boyajian | 180/273 |
| 3,838,748 | 10/1974 | Gray et al. | 180/273 |
| 4,019,602 | 4/1977 | Habiger | 180/273 |
| 4,294,327 | 10/1981 | Howard | 180/273 |
| 4,317,500 | 3/1982 | Bening | 180/273 |
| 4,381,042 | 4/1983 | Perry | 180/272 |

FOREIGN PATENT DOCUMENTS 60-157436 10/1985 Japan .

OTHER PUBLICATIONS

"Yale Industrial Trucks", Eaton Corporation, Industrial Truck Division, Aug., 1978, Electrical System, Std. Wiring Diagram.

*Primary Examiner*—D. Glenn Dayoan
*Attorney, Agent, or Firm*—Armstrong & Kubovcik

[57] ABSTRACT

In an industrial vehicle, a driver must leave his seat and manipulate a hydraulic lever for loading, while keeping the vehicle at a stopped position without stopping the engine.

The safety device includes a seat switch which detects the seating or absence of the driver, a lever switch which detects the forward, neutral or reverse position of the shift lever, and a control which de-energizes the power source of the solenoid valve when the seat switch detects the absence of the diver and re-inputs the power source of the solenoid valve only when the lever switch detects the neutral position.

5 Claims, 4 Drawing Sheets

SAFETY DEVICE FOR USE WHEN DRIVER LEAVES A SEAT OF AN INDUSTRIAL VEHICLE

This application is a continuation of application Ser. No. 417,153 filed Oct. 4, 1989, now abandoned.

BACKGROUND OF THE INVENTION

1. Field of the Invention

The present invention relates to a safety securing device to be used, when a driver leaves the seat of an industrial vehicle, such as a fork lift.

2. Description of Related Arts

An operator or driver of an industrial vehicle, such as a fork lift, is engaged in not only driving the vehicle but also loading. The driver therefore frequently leaves the seat of the vehicle, when the performance of other work makes it necessary. In this case, the key of the vehicle may be kept swiched on. When an industrial vehicle is equipped with a special attachment, for example, the driver must leave the driver's seat and manipulate a hydraulic lever for loading, while keeping the vehicle in a stopped position. In this case, it is very dangerous, if the driver does not revert the forward or reverse shift lever to a neutral position before leaving the driver's seat.

A safety device exists for use on an electric vehicle, that provides a seat switch for detecting the presence or absence of the driver on the seat, and a switch for de-energizing the power source of the main circuit, upon detection of the driver's absence with the seat switch. When this safety device is applied to a vehicle with an internal combustion engine, such as a gasoline engine or Diesel engine, the engine automatically stops upon the driver's leaving of a vehicle but must be restarted manually. This manual re-starting operation is as frequent as the driver's leaving the seat and is troublesome in the case of an internal combustion engine.

There is a proposed device that allows a vehicle to be kept in the stop position while the engine is operating. That is, the power source of the solenoid valve for switching the forward and reverse movement, is de-energized by means of a seat switch upon the driver's leaving the seat, and the shift lever is reverted to a neutral position by a spring. Upon implementing this proposed device, when a driver leaves the vehicle while the shift lever is in a forward or reverse position and then again takes a seat, the seat switch detects the presence of the driver and immediately energizes the power of the solenoid valve. In this case, however, the vehicle, which is idling, may run away due to a creep phenomenon of the torque-converter. The proposed device mentioned above therefore involves a danger.

SUMMARY OF THE INVENTION

It is a general object of the present invention to eliminate the drawbacks described above.

It is another object of the present invention to provide a safety device which can cope with such a special operating case as described above; that is, when a driver must leave the seat and manipulate a hydraulic lever for loading, while keeping the vehicle at the stopped position without stopping the engine.

In accordance with the objects of the present invention, there is provided a safety device for an industrial vehicle, for use when the driver leaves the seat. The vehicle comprises a shift lever for switching into forward and reverse directions, a solenoid valve for the hydraulic medium used for switching the shift lever, and a power source for the solenoid valve. The safety device comprises a seat switch for detecting the seating or absence of the driver, a lever switch for detecting the forward, neutral or reverse position of the shift lever, and a controlling device for de-energizing the power source of the solenoid valve when the seat switch detects the absence of the driver, and for re-inputting the power source of the solenoid valve only when the lever switch detects the neutral position.

According to this device, a driver can safely leave the seat, without stopping an engine or positioning the shift lever in a forward or reverse position. When the driver sits in the seat again, the power of the solenoid valve for forward or reverse movement is not re-input, unless the shift lever is reverted to the neutral position. Unintentional running away of a vehicle is therefore prevented.

DESCRIPTION OF PREFERRED EMBODIMENTS

Figure 1:
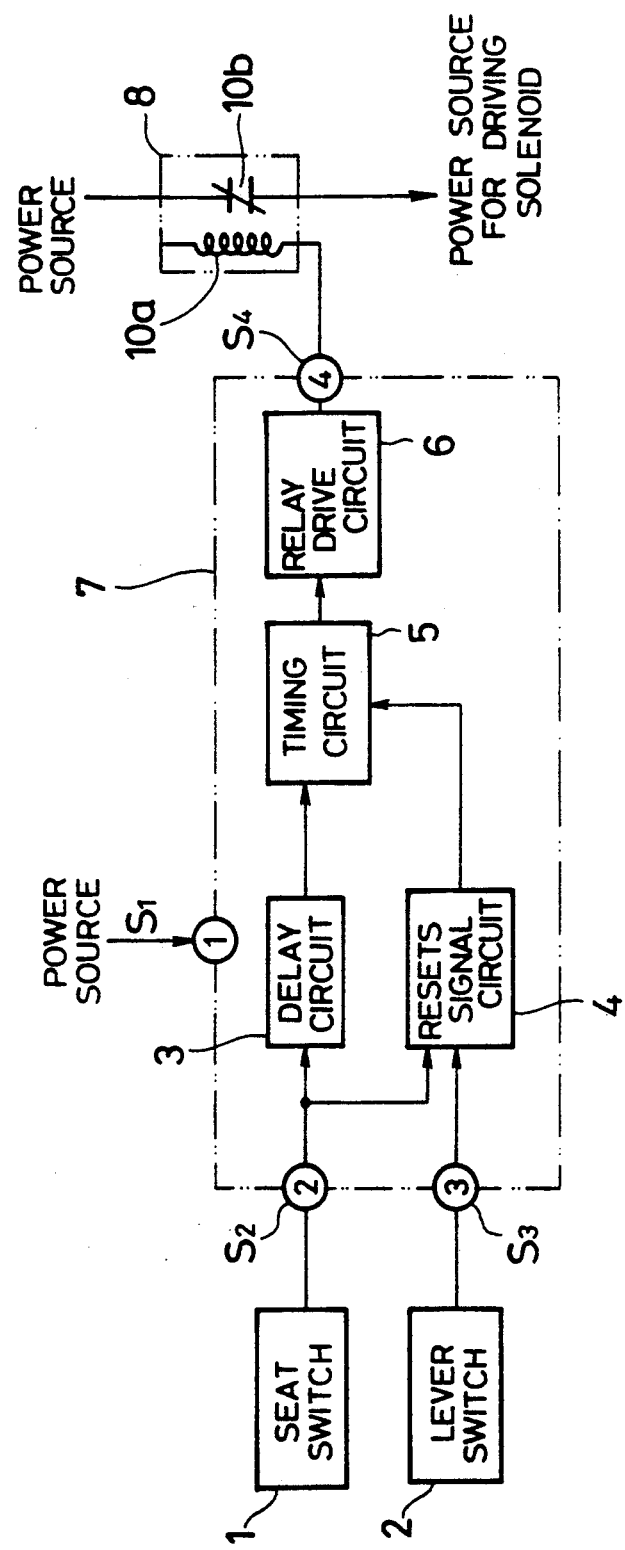
FIG. 1 is a block diagram showing the fundamental elements of the safety device according to an embodiment of the present invention.
Figure 4:
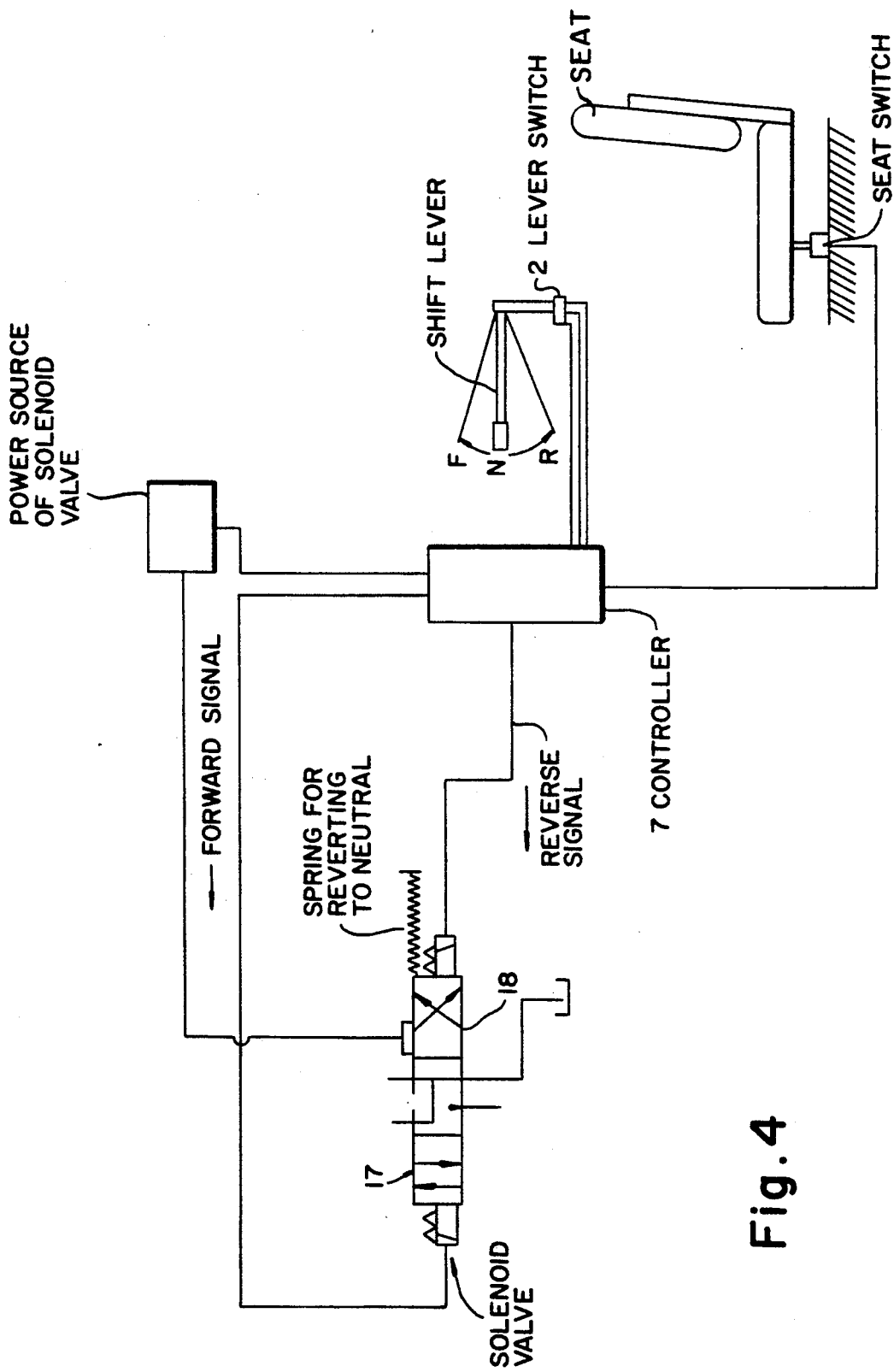
FIG. 4 shows the circuit for the industrial vehicle.

Referring to FIGS. 1 and 4, the safety device according to the present invention comprises: a seat switch 1 which is attached to the driver's seat to detect if the driver is seated; a lever switch which detects the forward (F), neutral (N) or reverse (R) position of the shift lever which is provided in the driver's cab and is manipulated by the driver; a delay circuit 3; a reset signal circuit 4; a timing circuit 5; a relay drive circuit 6; a controlling means 7, in which the elements 1 through 6 are mounted; and a relay 8 which is located outside the controlling means 7 and which is provided with a contact connected with the output terminal of the controlling means 7. $S_1$ is a power input which is generated by the key switch provided in the driver's cab. $S_2$ is a seat switch-signal which is generated by the seat switch 1 which is provided in the driver's cab. $S_3$ is a signal which is input only when the lever switch 2 detects the neutral position N. $S_4$ is an output signal of the controller 7.

The delay circuit 3, timing circuit 5, and the relay drive circuit 6 are connected in series, while the reset signal circuit 4 is connected in parallel with the delay circuit 3.

Figure 2:
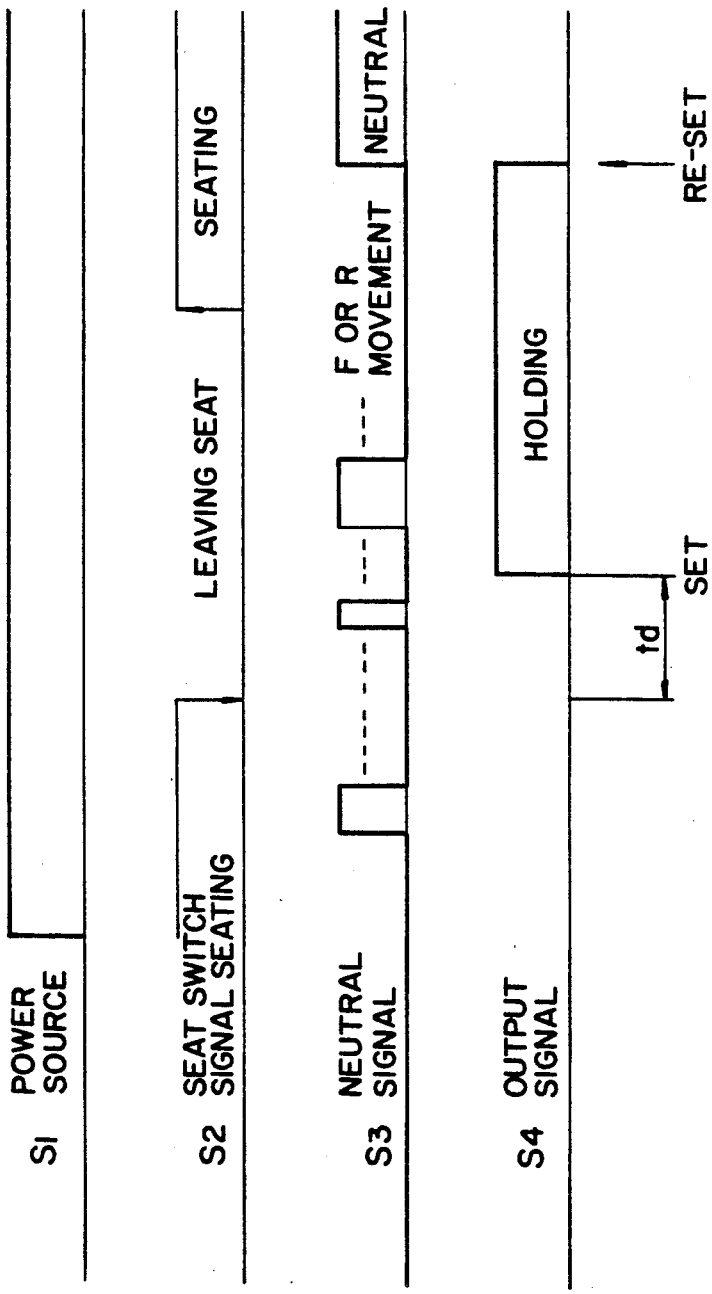
FIGS. 2(1)–2(4) time charts of input and output signals.
Figure 3:
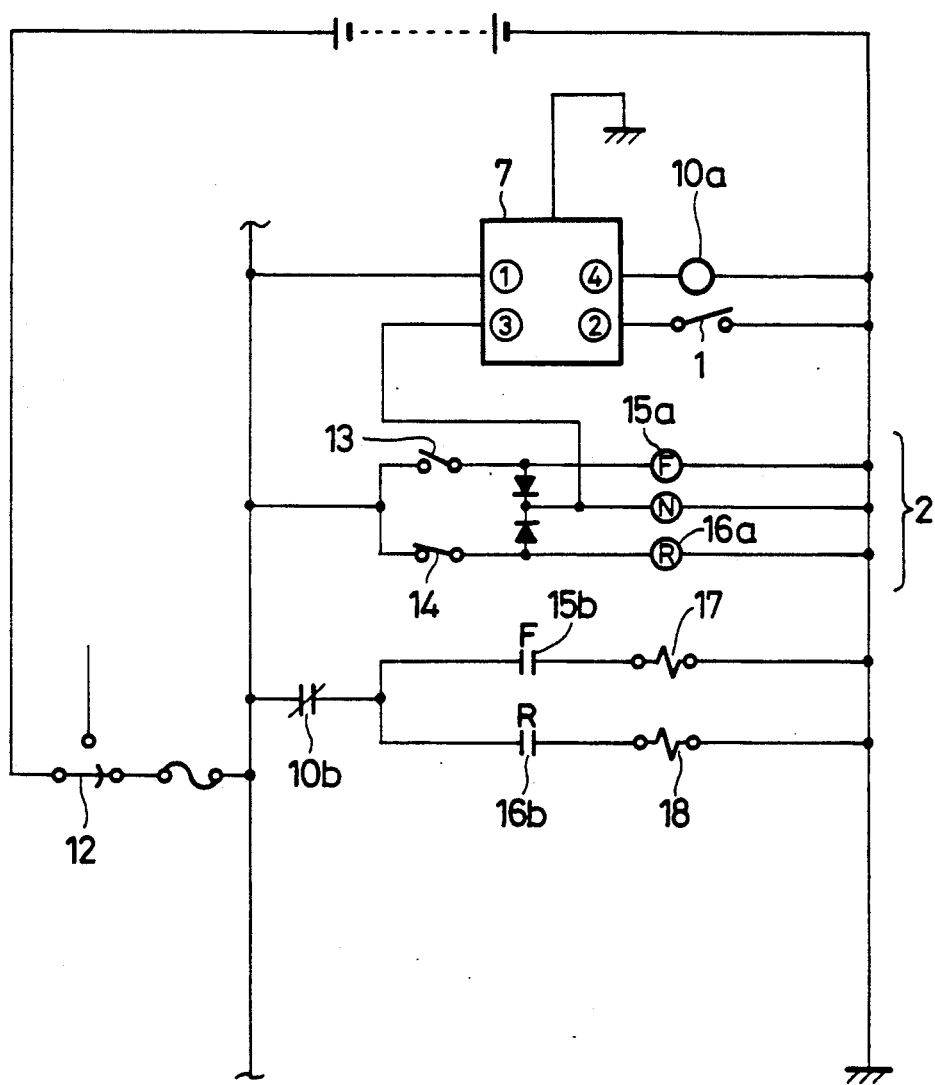
FIG. 3 is a drawing of an operating circuit.

The seat switch is turned ON when a driver sits in the driver's seat. When the driver then switches the key switch 12 on, $S_1$-ON signal (power signal) and $S_2$-ON signal (seating signal) are input into the controlling means 7, as shown in (1) and (2) of FIG. 2. When the driver then leaves the seat, the seat switch is turned OFF, and the output signal $S_4$ is generated, as shown in FIG. 2, and is transmitted through the timing circuit 5 and the relay drive circuit 6 with the predetermined delay time $t_d$. This signal $S_4$ energizes the relay 8 to open the contact 10b of a relay coil 10a and hence to disconnect the power source of the solenoid. The solenoid is therefore de-energized and the vehicle cannot be operated, even if the shift lever is in a forward or reverse position. The solenoid is reverted to a neutral position by means of a spring and the like. The hydraulic fluid used to engage the clutch is therefor cut and the engine power train is set in a neutral position without stopping the engine.

As shown in (2), (3), and (4) of FIG. 2, when the driver again sits in the driver seat, the reset circuit 4 is not activated and hence the reset signal is not generated, as long as the the shift lever for forward or backward movement is not positioned in the neutral position. When the driver, sitting on the seat, manipulates the shift lever to the neutral position, the neutral signal $S_3$ is input into the reset signal circuit 4 and the thus generated signal is applied to the timing circuit 5. The output signal $S_4$ is converted to a L (low) level, thereby releasing the relay 8. The contact 10b of the relay coil 10a is then closed to connect the power source of the solenoid to the solenoid.

The driver then manipulates the shift lever to position it in forward (F) or reverse (R). The switch 13 or 14 is closed depending upon the forward or backward movement, so as to energize its contact 15b or 16b and hence to open of the solenoid valve by energizing the coil 17 or to open the reserve port of the solenoid valve by energizing the coil for backward movement 18.

It is stipulated in FIG. 2 that the seat switch signal $S_2$ is at a high (H) level when the driver sits in the driver's seat, and the neutral signal $S_2$ is at a high (H) level when the shift lever is in the neutral position. However, these levels must not be high (H) but may be low (L).

The delay time (td) can prevent erroneous action of the seat switch, if the driver bounces when travelling on a rough surface.

I claim:

1. A safety device for an industrial vehicle comprising:
   a shift lever;
   a seat switch for detecting seating or non-seating of a driver;
   a lever switch for detecting forward, neutral or reverse position of the shift lever;
   a solenoid valve used for switching flow of a hydraulic medium for forward and reverse movement of the industrial vehicle; and
   a controlling means for de-energizing a power source of the solenoid valve when the seat switch detects non-seating of the driver and for re-inputting the power source of the solenoid valve only when a) the lever switch detects a neutral position of the shift lever and b) the seat switch detects the driver is seated while an engine of the industrial vehicle is running.

2. A safety device for an industrial vehicle according to claim 1, wherein said controlling means comprises: a first means for de-energizing the power source of the solenoid valve, which is connected to the seat switch; and, a second means for re-inputting the power source of the solenoid valve, which is connected to the lever switch and is connected to the first means in parallel.

3. A safety device for an industrial vehicle according to claim 2, wherein said first means comprises a delay circuit for delaying transmission of the seating signal by a delay time to prevent erroneous signals from said seat switch when travelling on a rough surface.

4. A safety device for an industrial vehicle according to claim 2 wherein said second means includes a reset signal circuit.

5. A safety device for an industrial vehicle, for use when a driver leaves a driver's seat while an engine of the industrial vehicle is running, said safety device comprising:
   a shift lever switching forward and reverse movement of the industrial vehicle;
   a solenoid valve operated by the shift lever, used for switching flow of a hydraulic medium for forward and reverse movement of the industrial vehicle;
   a power source for the solenoid valve;
   a spring means for reverting the solenoid valve to a neutral position when the power source is disconnected from the solenoid valve;
   a seat switch for detecting whether a driver of the industrial vehicle is seated;
   a lever switch detecting forward, neutral or reverse position of the shift lever; and
   a controlling means for de-energizing the power source of the solenoid valve when the seat switch detects the driver is not seated and for re-inputting the power source of the solenoid valve only when a) the lever switch detects the neutral position of the shift lever and b) the seat switch detects the driver is seated.

* * * * *